United States Patent
Hanai et al.

(10) Patent No.: US 8,099,540 B2
(45) Date of Patent: Jan. 17, 2012

(54) RECONFIGURABLE CIRCUIT

(75) Inventors: Takashi Hanai, Kawasaki (JP); Tetsuo Kawano, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 946 days.

(21) Appl. No.: 11/545,477

(22) Filed: Oct. 11, 2006

(65) Prior Publication Data

US 2007/0230336 A1 Oct. 4, 2007

(30) Foreign Application Priority Data

Mar. 10, 2006 (JP) .................................. 2006-065695

(51) Int. Cl.
  *G06F 13/00* (2006.01)
  *G06F 15/00* (2006.01)
  *G06F 7/38* (2006.01)
(52) U.S. Cl. ............. 710/317; 712/15; 712/36; 708/230
(58) Field of Classification Search .................. 710/317; 712/15, 36; 708/230
See application file for complete search history.

(56) References Cited

U.S. PATENT DOCUMENTS

| | | | | |
|---|---|---|---|---|
| 4,901,268 A | * | 2/1990 | Judd | 708/513 |
| 5,724,276 A | * | 3/1998 | Rose et al. | 708/235 |
| 5,920,497 A | * | 7/1999 | Rim | 708/620 |
| 6,122,719 A | * | 9/2000 | Mirsky et al. | 712/15 |
| 6,265,894 B1 | * | 7/2001 | Reblewski et al. | 326/39 |
| 6,476,634 B1 | * | 11/2002 | Bilski | 326/40 |
| 6,745,317 B1 | | 6/2004 | Mirsky et al. | |
| 6,963,890 B2 | * | 11/2005 | Dutta et al. | 708/319 |
| 7,149,996 B1 | * | 12/2006 | Lysaght et al. | 326/38 |
| 7,308,560 B2 | * | 12/2007 | Sugai et al. | 712/36 |
| 7,380,100 B2 | * | 5/2008 | Shimura et al. | 712/15 |
| 7,580,960 B2 | * | 8/2009 | Travieso et al. | 707/204 |
| 7,590,676 B1 | * | 9/2009 | Langhammer | 708/319 |
| 2003/0055852 A1 | * | 3/2003 | Wojko | 708/230 |
| 2005/0021578 A1 | * | 1/2005 | Chen et al. | 708/230 |
| 2006/0004902 A1 | * | 1/2006 | Simanapalli et al. | 708/670 |
| 2006/0004993 A1 | | 1/2006 | Uriu et al. | |
| 2006/0114918 A1 | | 6/2006 | Ikeda et al. | |

FOREIGN PATENT DOCUMENTS

EP 1 391 991 2/2004

(Continued)

OTHER PUBLICATIONS

Hideharu Amano et al., "A Dynamically Adaptive Hardware on Dynamically Reconfigurable Processor", IEICE TRANS. COMMUN., vol. E86-B, No. 12, Dec. 2003.

(Continued)

*Primary Examiner* — Khanh Dang
*Assistant Examiner* — Christopher a Daley
(74) *Attorney, Agent, or Firm* — Fujitsu Patent Center

(57) ABSTRACT

A reconfigurable circuit includes a network circuit for controlling connections between the output terminal and the input terminal of an arithmetic unit group, and a first selector connected between the arithmetic unit group and the network circuit. When a first control signal is in a first state, the first selector connects a first terminal of the arithmetic unit group to a first terminal of the network circuit, and also connects a second terminal of the arithmetic unit group to a second terminal of the network circuit. Meanwhile, when the first control signal is in a second state, the first selector connects the first terminal of the arithmetic unit group to the second terminal of the network circuit, and also connects the second terminal of the arithmetic unit group to the first terminal of the network circuit.

9 Claims, 9 Drawing Sheets

FOREIGN PATENT DOCUMENTS

| | | |
|---|---|---|
| EP | 1 612 694 | 1/2006 |
| JP | 06-274459 | 9/1994 |
| JP | 2005-044329 | 2/2005 |
| JP | 2005-166028 A | 6/2005 |
| JP | 2005-166029 A | 6/2005 |
| JP | 2006-018413 A | 1/2006 |
| WO | WO-03/023602 | 3/2003 |

OTHER PUBLICATIONS

Extended European Search Report, mailed Jun. 3, 2008 and issued in corresponding European Patent Application No. 06121240.3-2215.

Japanese Office Action for JP Application No. 2006-065695 mailed on Dec. 1, 2009. A partial English-language translation is provided for the Examiner's information.

* cited by examiner

F I G. 2
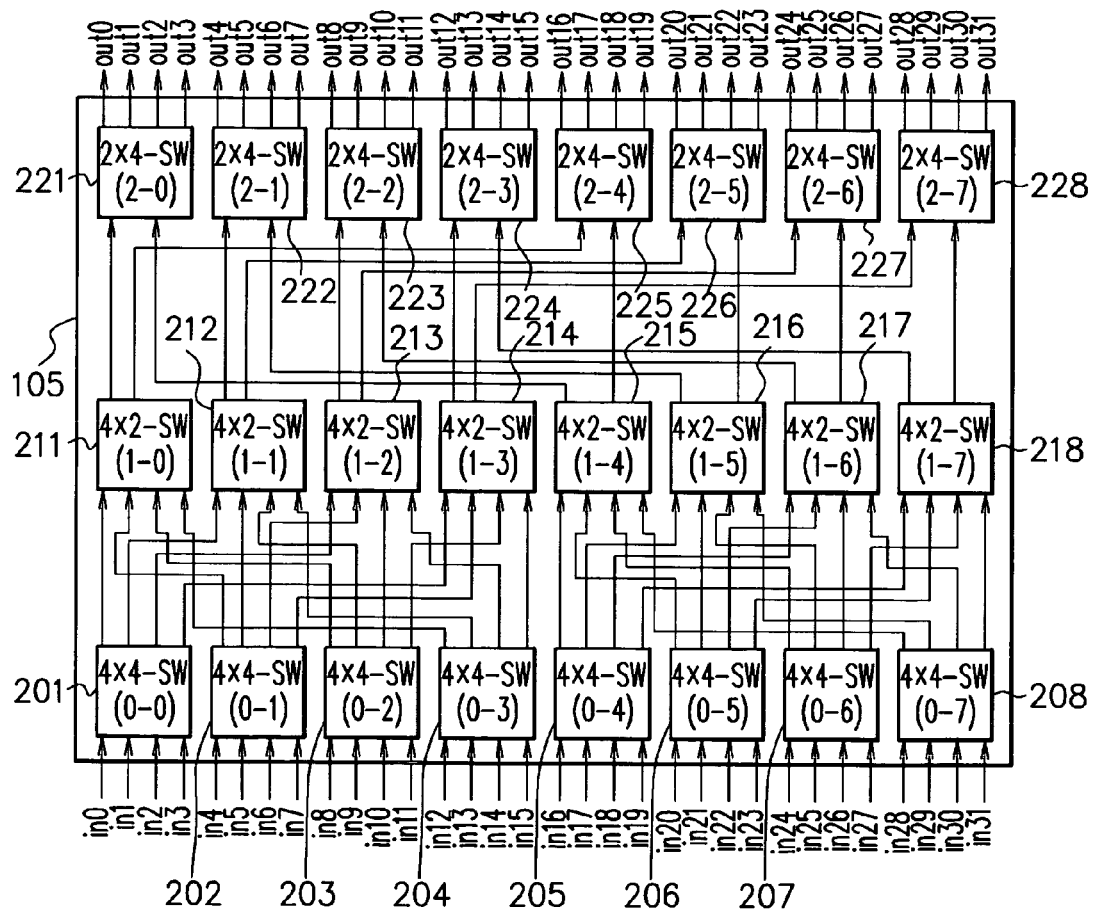

F I G. 3
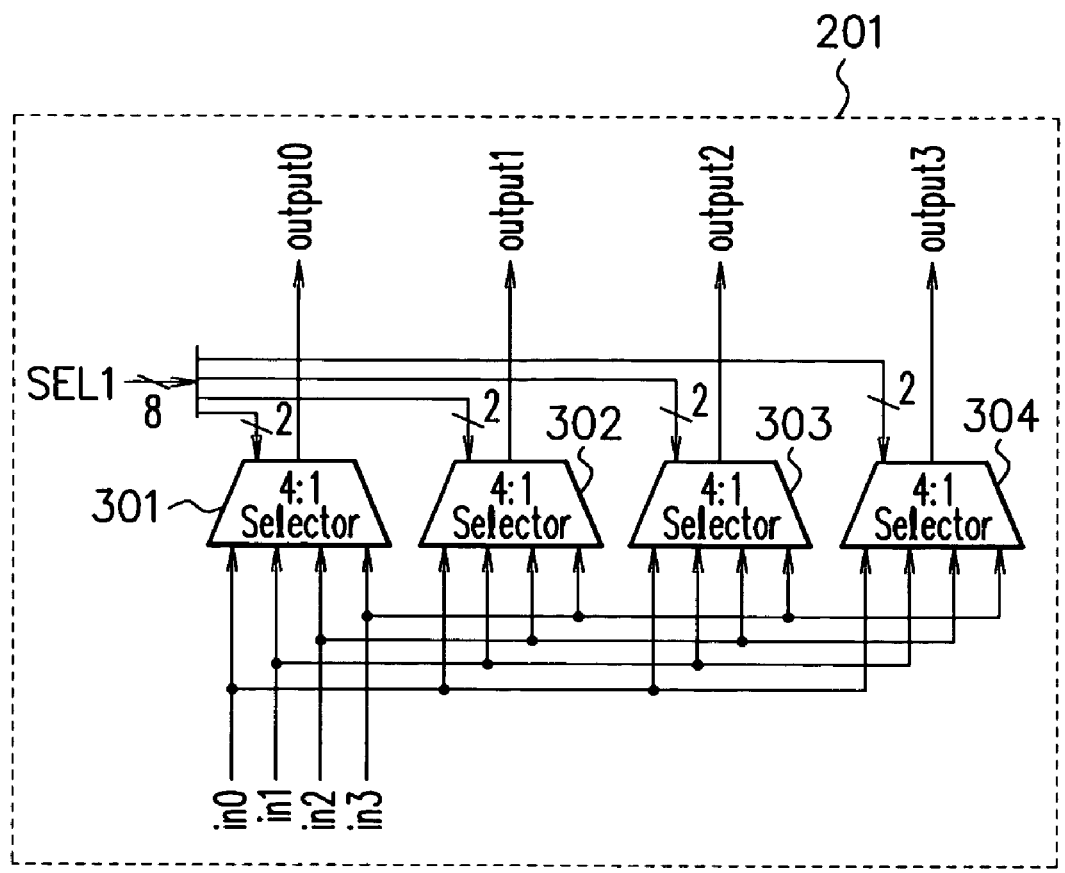

F I G. 7
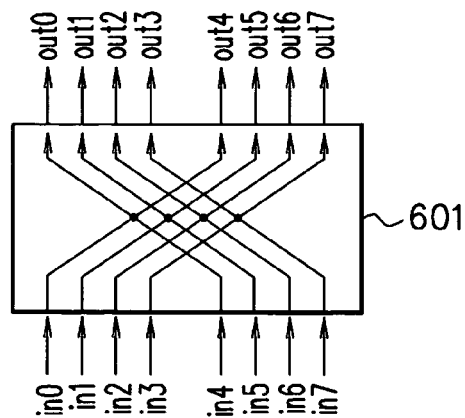
F I G. 8
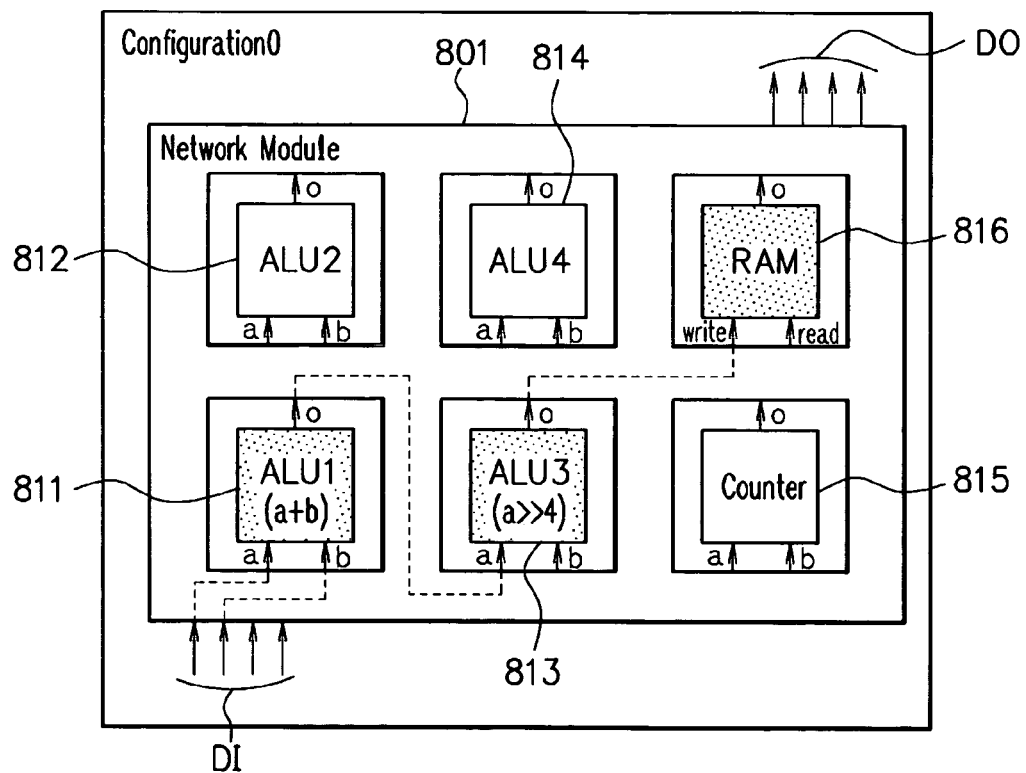

RECONFIGURABLE CIRCUIT

CROSS-REFERENCE TO RELATED APPLICATIONS

This application is based upon and claims the benefit of priority from the prior Japanese Patent Application No. 2006-065695, filed on Mar. 10, 2006, the entire contents of which are incorporated herein by reference.

BACKGROUND OF THE INVENTION

1. Field of the Invention

The present invention relates to a reconfigurable circuit.

2. Description of the Related Art

FIG. 8 shows a diagram illustrating a configuration example of a reconfigurable circuit in which a configuration 0 is set, and FIG. 9 shows a diagram illustrating a configuration example of a reconfigurable circuit in which a configuration 1 is set. The reconfigurable circuit includes a network module 801. The network module 801 receives the input data of external input data terminals DI and outputs data from external output data terminals DO. Also, the network module 801 includes a first ALU (arithmetic and logic unit) 811, a second ALU 812, a third ALU 813, a fourth ALU 814, a counter 815 and a RAM 816. Each ALU 811-814 receives the input data of input terminals (a) and (b), and outputs an arithmetic result from an output terminal (o). The counter 815 receives the input data of input terminals (a) and (b), and outputs a counter value from an output terminal (o). The RAM 816 receives the input signals of a write terminal 'write' and a read terminal 'read', and outputs data from an output terminal (o).

First, the configuration 0 shown in FIG. 8 is described. The external input data terminals DI are connected to the input terminals (a) and (b) of the first ALU 811. For example, the first ALU 811 adds data of the input terminals (a) and (b). The output terminal (o) of the first ALU 811 is connected to the input terminal (a) of the third ALU 813. For example, the third ALU 813 performs a 4-bit shift operation of the data of the input terminal (a). The output terminal (o) of the third ALU 813 is connected to a 'write' terminal of the RAM 816. The RAM 816 performs, for example, a write operation.

Next, the configuration 1 shown in FIG. 9 is described. The external input data terminals DI are connected to the input terminal (a) of the fourth ALU 814 and the input terminal (a) of the counter 815. The output terminal (o) of the counter 815 is connected to the read terminal 'read' of the RAM 816. The RAM 816 performs, for example, a read operation. The output terminal (o) of the RAM 816 is connected to the input terminal (b) of the fourth ALU 814. For example, the fourth ALU 814 multiplies data of the input terminals (a) and (b). The output terminal (o) of the fourth ALU 814 is connected to external output data terminals DO.

FIG. 10 shows a diagram illustrating a configuration example of the network module 801. The network module 801 includes four (4) first switches 1001 and four (4) second switches 1002, and controls the switches 1001, 1002 based on a 64-bit control signal SEL. Each of switches 1001 and 1002 includes four input terminals and four output terminals, and can select one of the data input of the four input terminals and output the selected data from each output terminal. The 64-bit control signal SEL includes eight (8) 8-bit control signals. The eight switches 1001 and 1002 respectively perform control based on the eight 8-bit control signals. The input terminals of the first switch 1001 are connected to the above-mentioned arithmetic units 811-816 and the external input data terminals DI. The output terminals of the first switch 1001 are connected to the input terminals of the second switch 1002. The output terminals of the second switch 1002 are connected to the input terminals of the arithmetic units 811-816 and the external output data terminals DO.

As described above, the network module 801 can switch the functions of the arithmetic units 811-816 by switching the connections among the arithmetic units 811-816 according to the control signals SEL for configuration setting.

In Patent document 1 shown below, there is described a semiconductor integrated circuit including an input switch connected to a plurality of data input nodes, an output switch connected to a plurality of data output nodes, a first data path having an arithmetic unit and a first data holding circuit disposed between the above input switch and the above output switch, and a second data path having a second data holding circuit disposed between the input switch and the output switch, in which the first data holding circuit stores arithmetic result data of the arithmetic unit and the second data holding circuit holds data being input to any of the plurality of data input nodes.

In Patent document 2 shown below, there is described a semiconductor integrated circuit device having an embedded nonvolatile memory devices, a plurality of processors enabling functional modification by rewriting the memory devices and a unit for interconnecting the above plurality of processors in a programmable manner, formed on a single semiconductor substrate.

[Patent document 1] Japanese Patent Application Laid-open No. 2005-44329.

[Patent document 2] Japanese Patent Application Laid-open No. Hei 6-274459.

It is desirable that the network module 801 can connect from the output terminals of each arithmetic unit 811-816 to the input terminals of each arithmetic unit 811-816 arbitrarily for any combinations. However, as shown in FIG. 10, it is configured such that the wirings are used in common so as to reduce both the number of bits of the control signal SEL and the circuit scale. As a result, in some cases, there exist combinations of not being connectable, because of the occurrence of conflict in the network module 801.

SUMMARY OF THE INVENTION

It is an object of the present invention to provide a reconfigurable circuit capable of increasing the number of connectable combinations of the output terminals and the input terminals in an arithmetic unit group, while reducing the circuit scale.

According to one aspect of the present invention, there is provided a reconfigurable circuit including an arithmetic unit group performing arithmetic operations, a network circuit controlling connections among the output terminals and the input terminals of the arithmetic unit group, and a first selector connected between the arithmetic unit group and the network circuit. The above arithmetic unit group includes a first terminal and a second terminal, and the above network circuit includes a first terminal and a second terminal, and when a first control signal is in a first state, the first selector connects the first terminal of the arithmetic unit group to the first terminal of the network circuit, and also connects the second terminal of the arithmetic unit group to the second terminal of the network circuit, while when a first control signal is in a second state, the first selector connects the first terminal of the arithmetic unit group to the second terminal of the network circuit, and also connects the second terminal of the arithmetic unit group to the first terminal of the network circuit.

BRIEF DESCRIPTION OF THE DRAWINGS

FIG. 2 shows a diagram illustrating a configuration example of a network circuit.

FIG. 3 shows a diagram illustrating a configuration example of a switch.

FIG. 7 shows a diagram illustrating a configuration example of a swap selector.

FIG. 8 shows a diagram illustrating a configuration example of a reconfigurable circuit in which a configuration 0 is set.

DETAILED DESCRIPTION OF THE PREFERRED EMBODIMENTS

Figure 10:
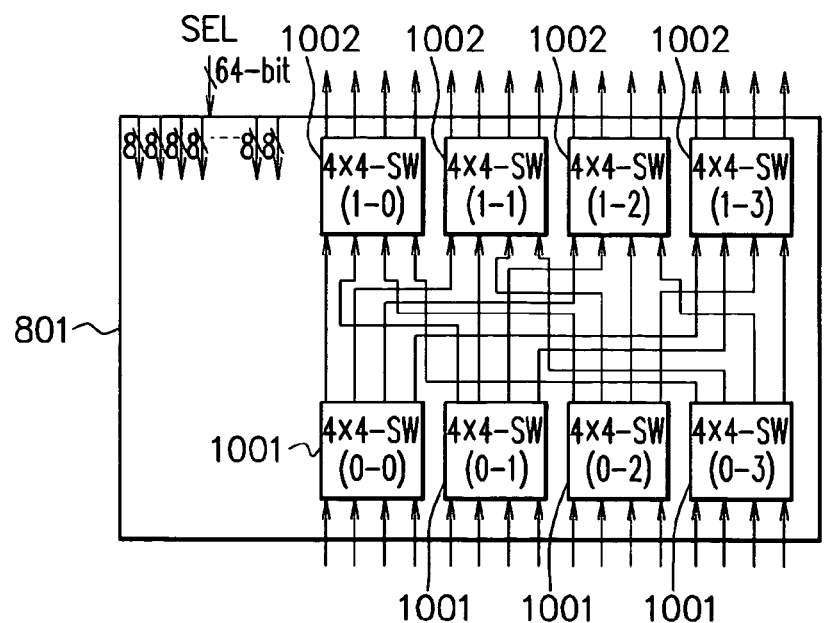
FIG. 10 shows a diagram illustrating a configuration example of a network module.
Figure 11:
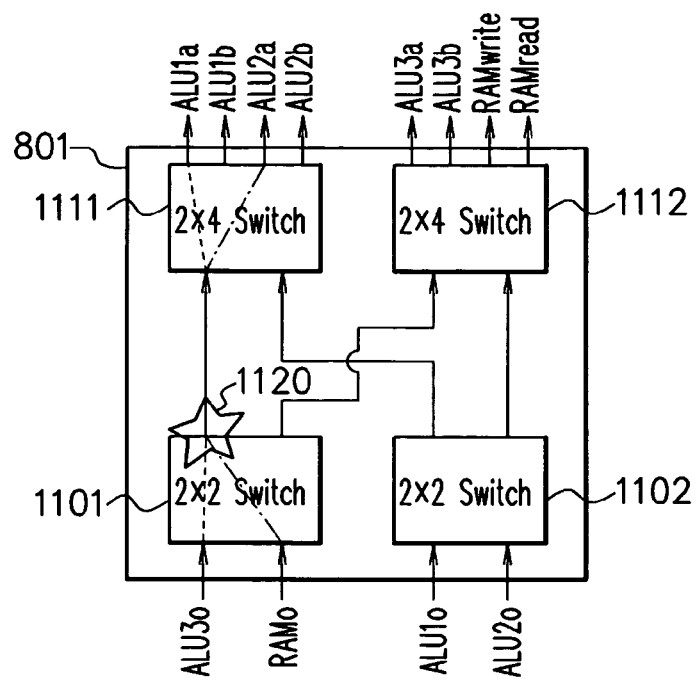
FIG. 11 shows a diagram illustrating a configuration example simplified from the network module shown in FIG. 10.

FIG. 11 shows a diagram illustrating a configuration example simplified from the network module 801 shown in FIG. 10. First switches 1101 and 1102 are configured by simplifying the first switches 1001 shown in FIG. 10. Second switches 1111 and 1112 are configured by simplifying the second switches 1002 shown in FIG. 10.

Each of the switches 1101 and 1102 includes two input terminals and two output terminals, respectively, and it is possible to select one of the data of the two input terminals, and output the selected data from each output terminal. Each of the switches 1111 and 1112 includes two input terminals and four output terminals, respectively, and it is possible to select one of the data of the two input terminals, and output the selected data from each output terminal.

The two input terminals of the switch 1101 are connected to an output terminal ALU3o of the third ALU 813 and an output terminal RAMo of the RAM 816, respectively shown in FIG. 8. As to the two output terminals of the switch 1101, one is connected to an input terminal of the switch 1111, while the other is connected to an input terminal of the switch 1112.

The two input terminals of the switch 1102 are connected to an output terminal ALU1o of the first ALU 811 and an output terminal ALU2o of the second ALU 812, respectively shown in FIG. 8. As to the two output terminals of the switch 1102, one is connected to an input terminal of the switch 1111, while the other is connected to an input terminal of the switch 1112.

The four output terminals of the switch 1111 are connected to a first input terminal ALU1a of the first ALU 811, a second input terminal ALU1b of the first ALU 811, a first input terminal ALU2a of the second ALU 812, and a second input terminal ALU2b of the second ALU 812, respectively shown in FIG. 8.

The four output terminals of the switch 1112 are connected to a first input terminal ALU3a of the third ALU 813, a second input terminal ALU3b of the third ALU 813, a write terminal 'RAMwrite' of the RAM 816, and a read terminal 'RAMread' of the RAM 816, respectively shown in FIG. 8.

Now, consider the case that the network module 801 connects the output terminal ALU3o to the input terminal ALU1a, and also connects the output terminal RAMo to the input terminal ALU2a. The output terminal ALU3o is connectable to the input terminal ALU1a via the switches 1101 and 1111. The output terminal RAMo is also connectable to the input terminal ALU2a via the switches 1101 and 1111. Since there is only one connection path between the switches 1101 and 1111, the path between the terminals ALU3o and ALU1a competes with the path between the terminals RAMo and ALU2a at an output terminal 1120 of the switch 1101. As a result, it is not possible to simultaneously connect both the path between the terminals ALU3o and ALU1a and the path between the terminals RAMo and ALU2a.

Figure 12:
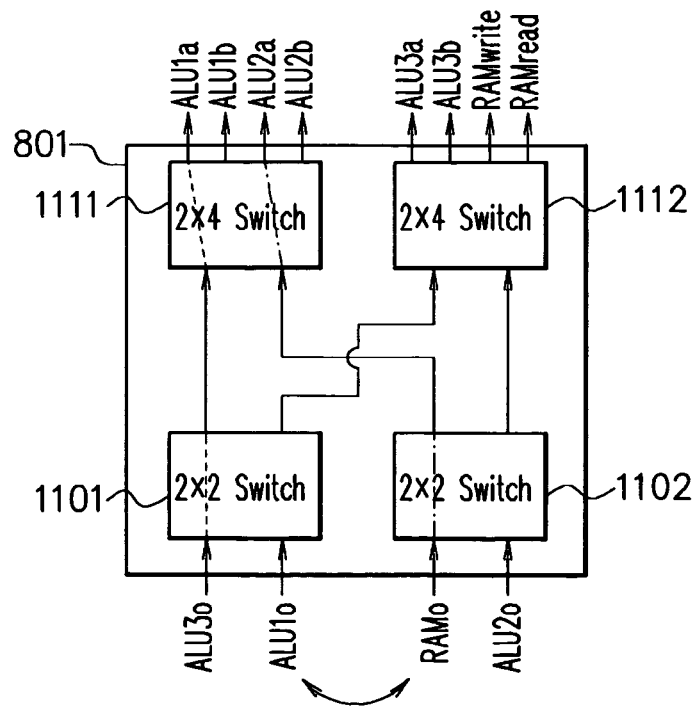
FIG. 12 shows a diagram illustrating a circuit in which output terminals RAMo and ALU1o in the circuit shown in FIG. 11 are exchanged.

FIG. 12 shows a diagram illustrating a circuit in which the output terminals RAMo and ALU1o in the circuit shown in FIG. 11 are exchanged. Here, similar to the above case, consider the case that the network module 801 connects the output terminal ALU3o and the input terminal ALU1a and also connects the output terminal RAMo and the input terminal ALU2a. The output terminal ALU3o is connected to the input terminal ALU1a via the switches 1101 and 1111. The output terminal RAMo is also connected to the input terminal ALU2a via the switches 1102 and 1111. Since one connection path exists between the switches 1101 and 1111, and another connection path exists between the switches 1102 and 1111, it is possible to connect both paths between the terminals ALU3o and ALU1a and between the terminals RAMo and ALU2a, simultaneously.

In the case of FIG. 11, data collision may possibly occur in the network module 801. To avoid such the case, as shown in FIG. 12, it is possible to modify the connections between the network module 801 and the arithmetic units. However, because the output terminals of the arithmetic units are fixed by hardware, the positions thereof cannot be exchanged. Therefore, according to the present embodiment, by exchanging the connections of the signal lines of the output terminals RAMo and ALU1o of the arithmetic unit, data collision in the network module 801 is avoided, as shown in FIG. 12.

Figure 1:
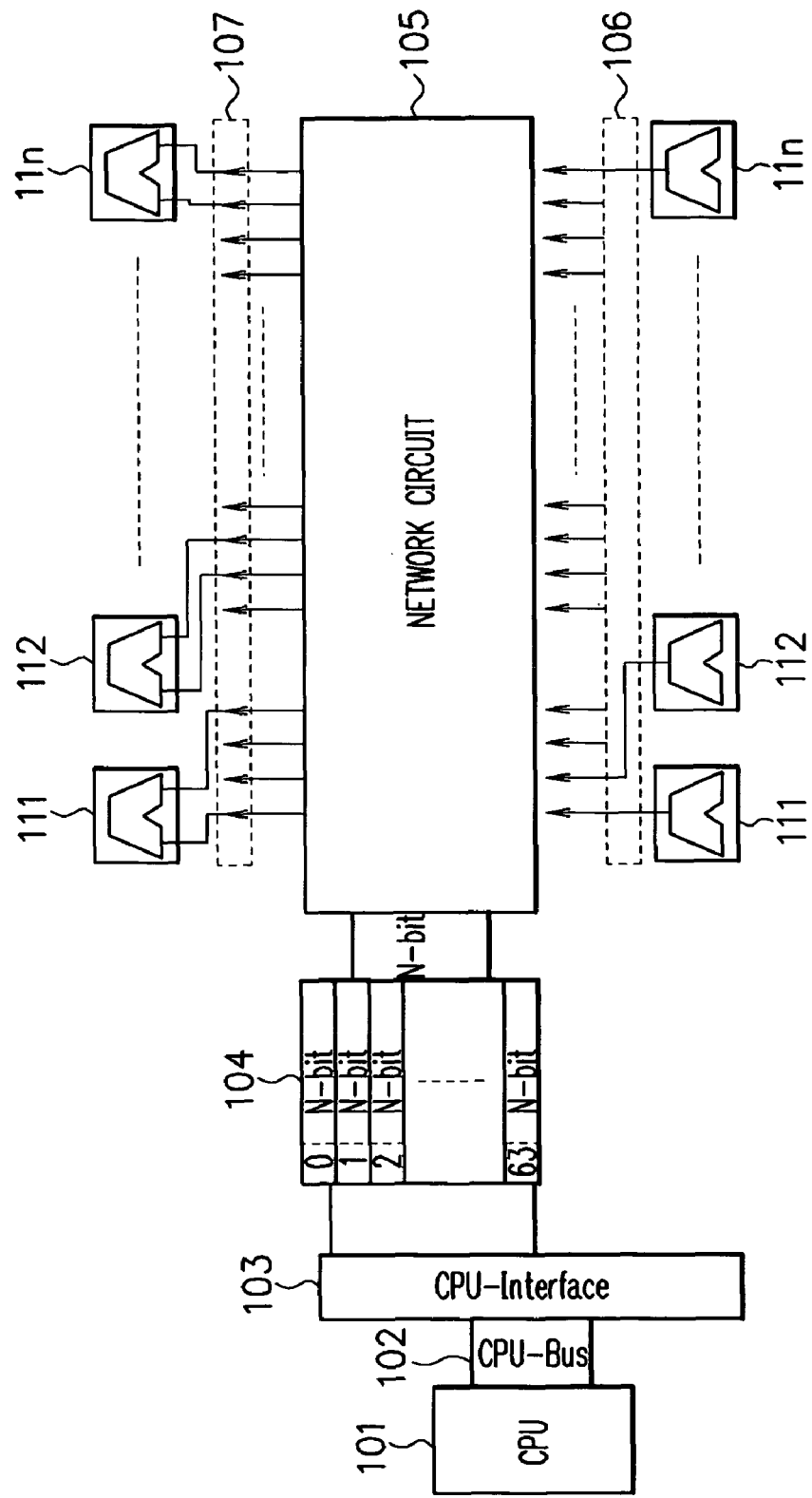
FIG. 1 shows a diagram illustrating a configuration example of a reconfigurable circuit according to an embodiment of the present invention.

FIG. 1 shows a diagram illustrating a configuration example of a reconfigurable circuit according to the embodiment of the present invention. The reconfigurable circuit can be switched to either the circuit shown in FIG. 8 or the circuit shown in FIG. 9 by means of configuration settings.

A CPU 101 is connected to a CPU interface 103 via a CPU bus 102. A configuration RAM 104 is a network memory, which is connected to the CPU 101 via the CPU bus 102 and the CPU interface 103. Also, the configuration RAM 104 stores network control signal information (configuration data) for 64 planes: a configuration 0 to a configuration 63. The network control signal information has N bits for one plane. The CPU 101 can write the network control signal information for 64 planes in the configuration RAM 104, in advance.

When setting, for example, the configuration 0 shown in FIG. 8, the CPU 101 outputs the address of the configuration 0 to the configuration RAM 104. Then, the configuration RAM 104 outputs N-bit network control signal information for the configuration 0 to a network circuit 105.

Figure 9:
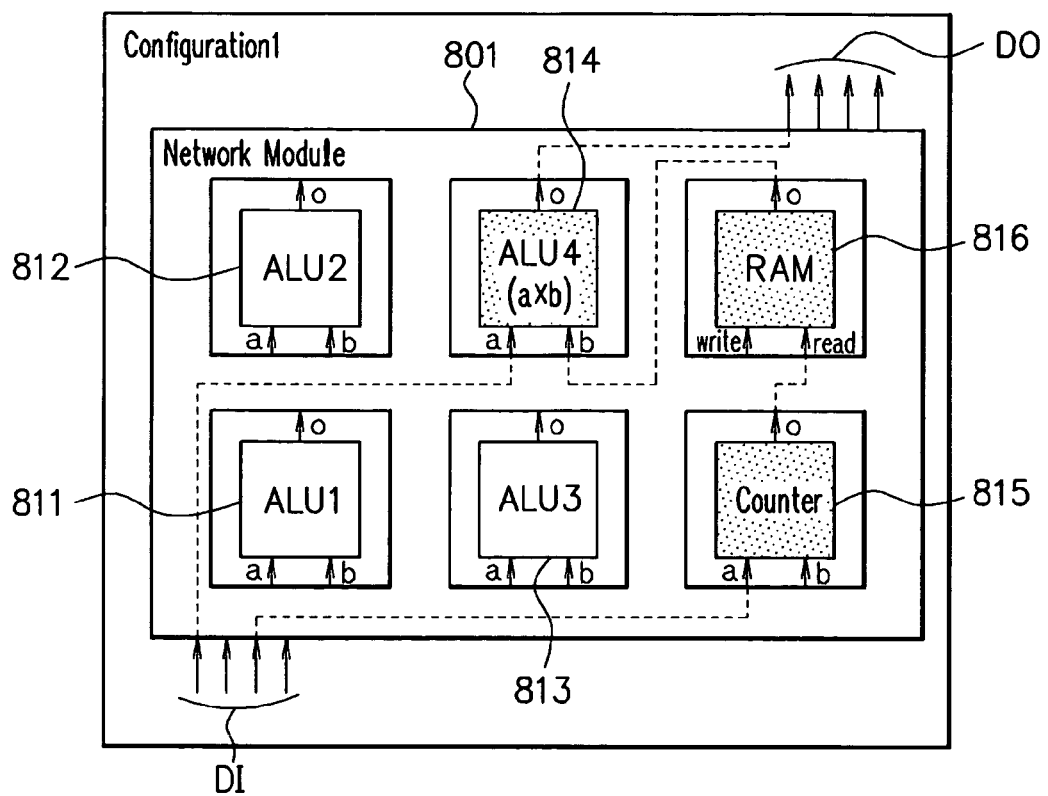
FIG. 9 shows a diagram illustrating a configuration example of a reconfigurable circuit in which a configuration 1 is set.

Meanwhile, when setting, for example, the configuration 1 shown in FIG. 9, the CPU 101 outputs the address of the configuration 1 to the configuration RAM 104. Then, the configuration RAM 104 outputs N-bit network control signal information for the configuration 1 to the network circuit 105.

As described above, the configuration RAM 104 can dynamically modify the configuration by outputting N-bit network control signal information to the network circuit 105, according to the configuration address being input from the CPU 101.

An arithmetic unit group includes (n) arithmetic units 111-11n for performing arithmetic operation. The network circuit 105 controls (dynamically switches the combinations of) the connections between the output terminals of the (n) arithmetic units 111-11n and the input terminals of the (n) arithmetic units 111-11n. The details thereof will be described later referring to FIG. 2. A selector 106 is connected between the output terminals of the (n) arithmetic units 111-11n and the input terminals of the network circuit 105, and thereby the connections between the output terminals of the (n) arithmetic units 111-11n and the input terminals of the network circuit 105 can be exchanged. Similarly, a selector 107 is connected between the input terminals of the (n) arithmetic units 111-11n and the output terminals of the network circuit 105, and thereby the connections between the input terminals of the (n) arithmetic units 111-11n and the output terminals of the network circuit 105 can be exchanged. With this, data collision in the network circuit 105 can be avoided, as shown in FIG. 12.

FIG. 2 shows a diagram illustrating a configuration example of the network circuit 105. The network circuit 105 includes first switches 201-208, second switches 211-218 and third switches 221-228. Each first switch 201-208 includes four input terminals and four output terminals, and can select and output either one of the four input terminal data from each output terminal. Each second switch 211-218 includes four input terminals and two output terminals, and can select and output either one of the four input terminal data from each output terminal. Each third switch 221-228 includes two input terminals and four output terminals, and can select and output either one of the two input terminal data from each output terminal.

The network circuit 105 includes 32 input terminals in0-in31 and 32 output terminals out0-out31. The 32 input terminals in0-in31 are connected to the output terminals of the arithmetic units 111-11n via the selector 106 shown in FIG. 1. The 32 output terminals out0-out31 are connected to the input terminals of the arithmetic units 111-11n via the selector 107 shown in FIG. 1.

As to the switch 201, the four input terminals thereof are connected to the four input terminals in0-in3, and the four output terminals thereof are connected to the input terminals of the switches 211-214. As to the switch 202, the four input terminals thereof are connected to the four input terminals in4-in7, and the four output terminals thereof are connected to the input terminals of the switches 211-214. As to the switch 203, the four input terminals thereof are connected to the four input terminals in8-in11, and the four output terminals thereof are connected to the input terminals of the switches 211-214. As to the switch 204, the four input terminals thereof are connected to the four input terminals in12-in15, and the four output terminals thereof are connected to the input terminals of the switches 211-214.

As to the switch 205, the four input terminals thereof are connected to the four input terminals in16-in19, and the four output terminals thereof are connected to the input terminals of the switches 215-218. As to the switch 206, the four input terminals thereof are connected to the four input terminals in20-in23, and the four output terminals thereof are connected to the input terminals of the switches 215-218. As to the switch 207, the four input terminals thereof are connected to the four input terminals in24-in27, and the four output terminals thereof are connected to the input terminals of the switches 215-218. As to the switch 208, the four input terminals thereof are connected to the four input terminals in28-in31, and the four output terminals thereof are connected to the input terminals of the switches 215-218.

The two output terminals of the switch 211 are connected to the input terminals of the switches 221, 225. The two output terminals of the switch 212 are connected to the input terminals of the switches 222, 226. The two output terminals of the switch 213 are connected to the input terminals of the switches 223, 227. The two output terminals of the switch 214 are connected to the input terminals of the switches 224, 228.

The two output terminals of the switch 215 are connected to the input terminals of the switches 221, 225. The two output terminals of the switch 216 are connected to the input terminals of the switches 222, 226. The two output terminals of the switch 217 are connected to the input terminals of the switches 223, 227. The two output terminals of the switch 218 are connected to the input terminals of the switches 224, 228.

The four output terminals of the switch 221 are connected to the output terminals out0-out3. The four output terminals of the switch 222 are connected to the output terminals out4-out7. The four output terminals of the switch 223 are connected to the output terminals out8-out11. The four output terminals of the switch 224 are connected to the output terminals out12-out15. The four output terminals of the switch 225 are connected to the output terminals out16-out19. The four output terminals of the switch 226 are connected to the output terminals out20-out23. The four output terminals of the switch 227 are connected to the output terminals out24-out27. The four output terminals of the switch 228 are connected to the output terminals out28-out31.

FIG. 3 shows a diagram illustrating a configuration example of the switch 201. The switch 201 includes selectors 301-304. Also, the switch 201 receives the input data of the input terminals in0-in3, and outputs data from output terminals output0-output3, according to a network control signal SEL1. The 8-bit network control signal SEL1 is distributed after being divided into four 2-bit signals, and then output to the selectors 301-304.

The selector 301 receives the input data of the four input terminals in0-in3 according to a 2-bit signal out of the network control signal SEL1, selects and outputs either one of the input data from the output terminal output0. The selector 302 receives the input data of the four input terminals in0-in3 according to a 2-bit signal out of the network control signal SEL1, selects and outputs either one of the input data from the output terminal output1. The selector 303 receives the input data of the four input terminals in0-in3 according to a 2-bit signal out of the network control signal SEL1, selects and outputs either one of the input data from the output terminal output2. The selector 304 receives the input data of the four input terminals in0-in3 according to a 2-bit signal out of the network control signal SEL1, selects and outputs either one of the input data from the output terminal output3. Other switches 202-208, 211-218 and 221-228 have the similar configurations as the switch 201.

Figure 4:
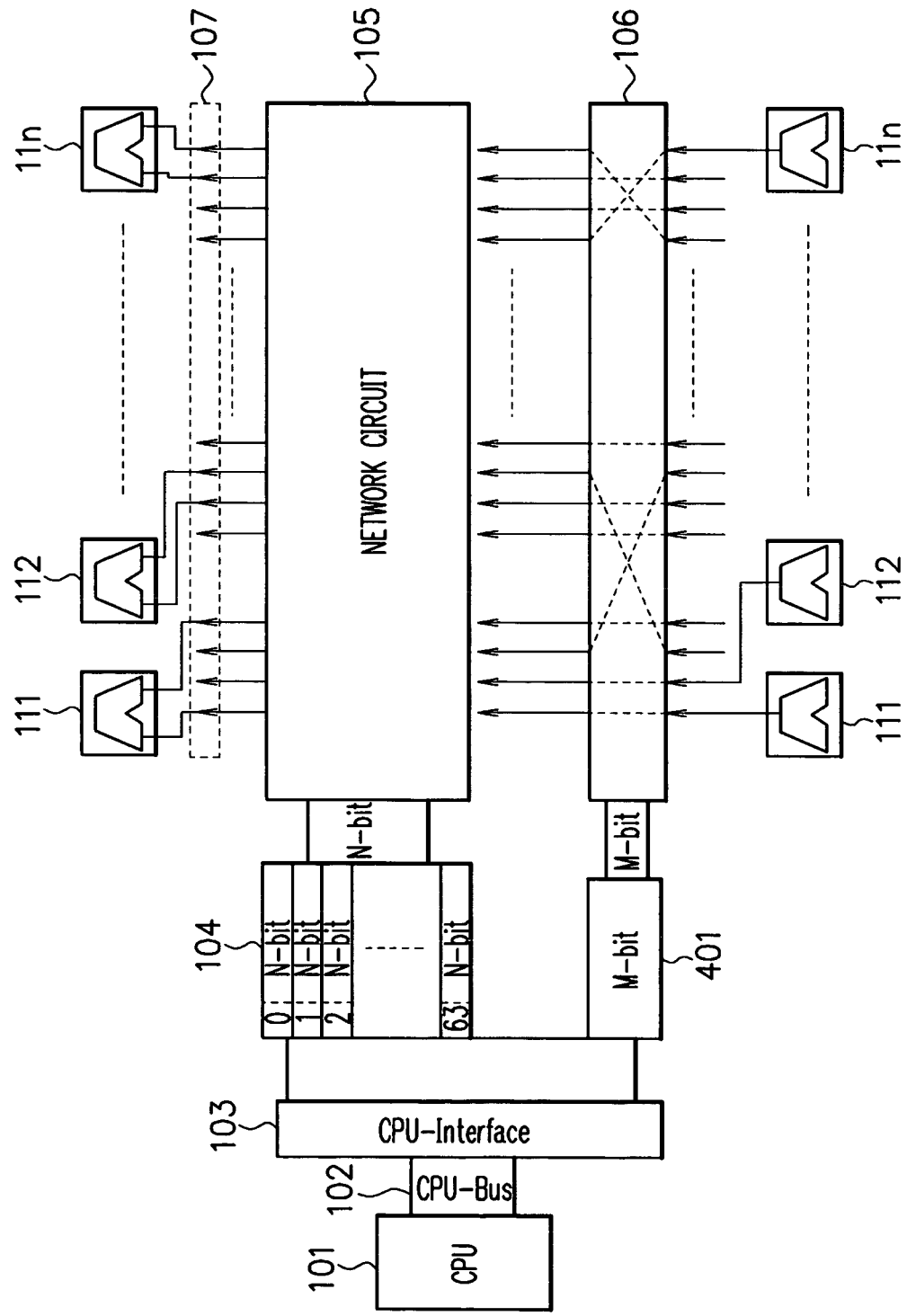
FIG. 4 shows a diagram illustrating a more concrete configuration example of the reconfigurable circuit shown in FIG. 1.

FIG. 4 shows a diagram illustrating a more concrete configuration example of the reconfigurable circuit shown in FIG. 1. In FIG. 4, a register 401 is added to the configuration shown in FIG. 1. The register 401 is a flip-flop, which is connected to the CPU 101 via the CPU bus 102 and the CPU interface 103, and stores M-bit selector control signal information. The CPU 101 can write selector control signal information having N bits into the register 401. According to the selector control signal information stored in the register 401, the selector 106 can exchange the connections between the output terminals of the arithmetic units 111-11$n$ and the input terminals of the network circuit 105.

Figure 5:
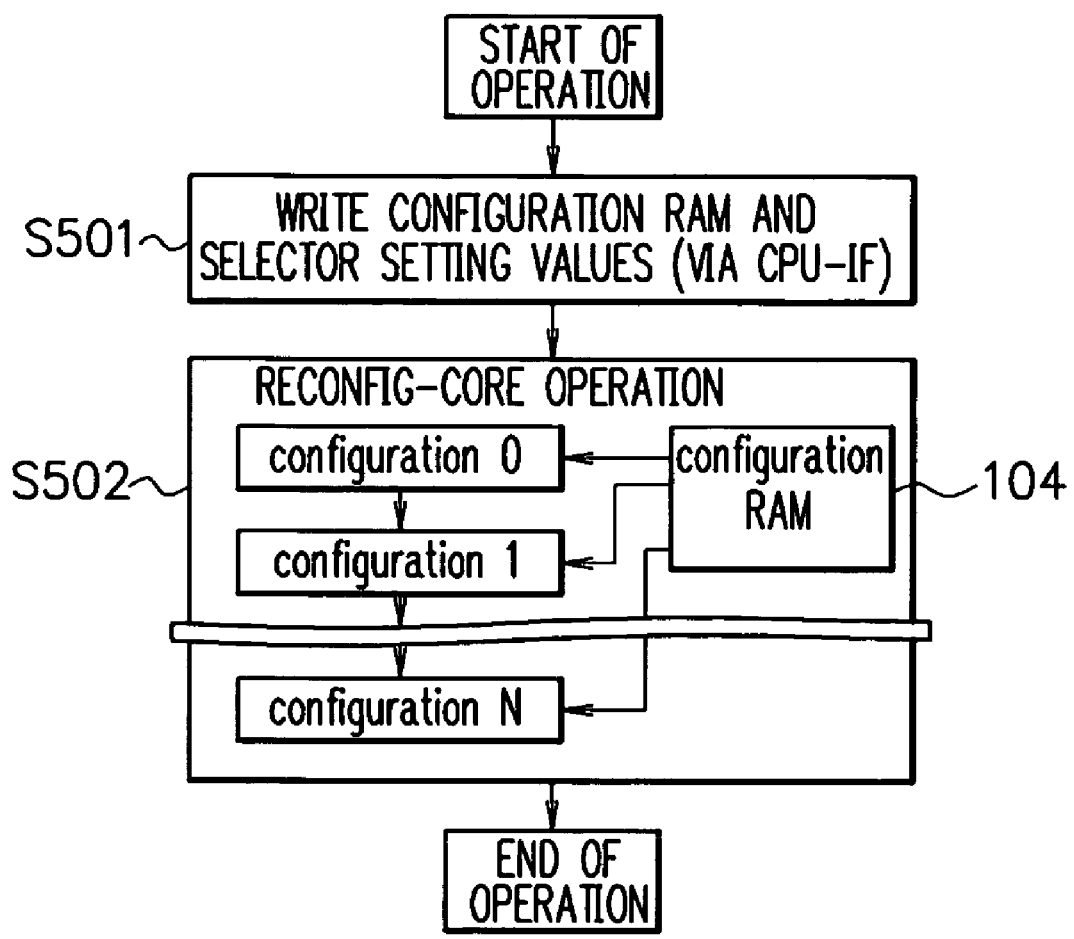
FIG. 5 shows a flowchart illustrating an operation example of the reconfigurable circuit shown in FIG. 4.

FIG. 5 shows a flowchart illustrating an operation example of the reconfigurable circuit shown in FIG. 4. First, when the start of operation is instructed, in step S501, the CPU 101 writes the network control signal information into the configuration RAM 104 via the network interface 103, and writes the selector control signal information into the register 401. The above processing is initiation setting processing, which is performed once at the time of initiation. According to the selector control signal information stored in the register 401, the selector 106 connects between the output terminals of the arithmetic units 111-11$n$ and the input terminals of the network circuit 105. Similarly, the selector 107 connects between the input terminals of the arithmetic units 111-11$n$ and the output terminals of the network circuit 105.

Next, in step S502, a core operation of reconfiguration is performed. The CPU 101 outputs an address for setting configuration to the configuration RAM 104. According to the above address, the configuration RAM 104 outputs network control signal information of the set configuration to the network circuit 105. According to the above network control signal information, the network circuit 105 connects between the input terminals in0-in31 and the output terminals out0-out31 shown in FIG. 2. For example, based on the instruction from the CPU 101, the configuration RAM 104 sequentially outputs to the network circuit 105 the network control signal information in regard to the configuration 0 to the configuration N. The network circuit 105 sequentially performs connections based on the settings of the configuration 0 to the configuration N. Thus, it is possible to operate the reconfigurable circuit by dynamically switching the functions of the configuration 0 to the configuration N in succession.

Figure 6:
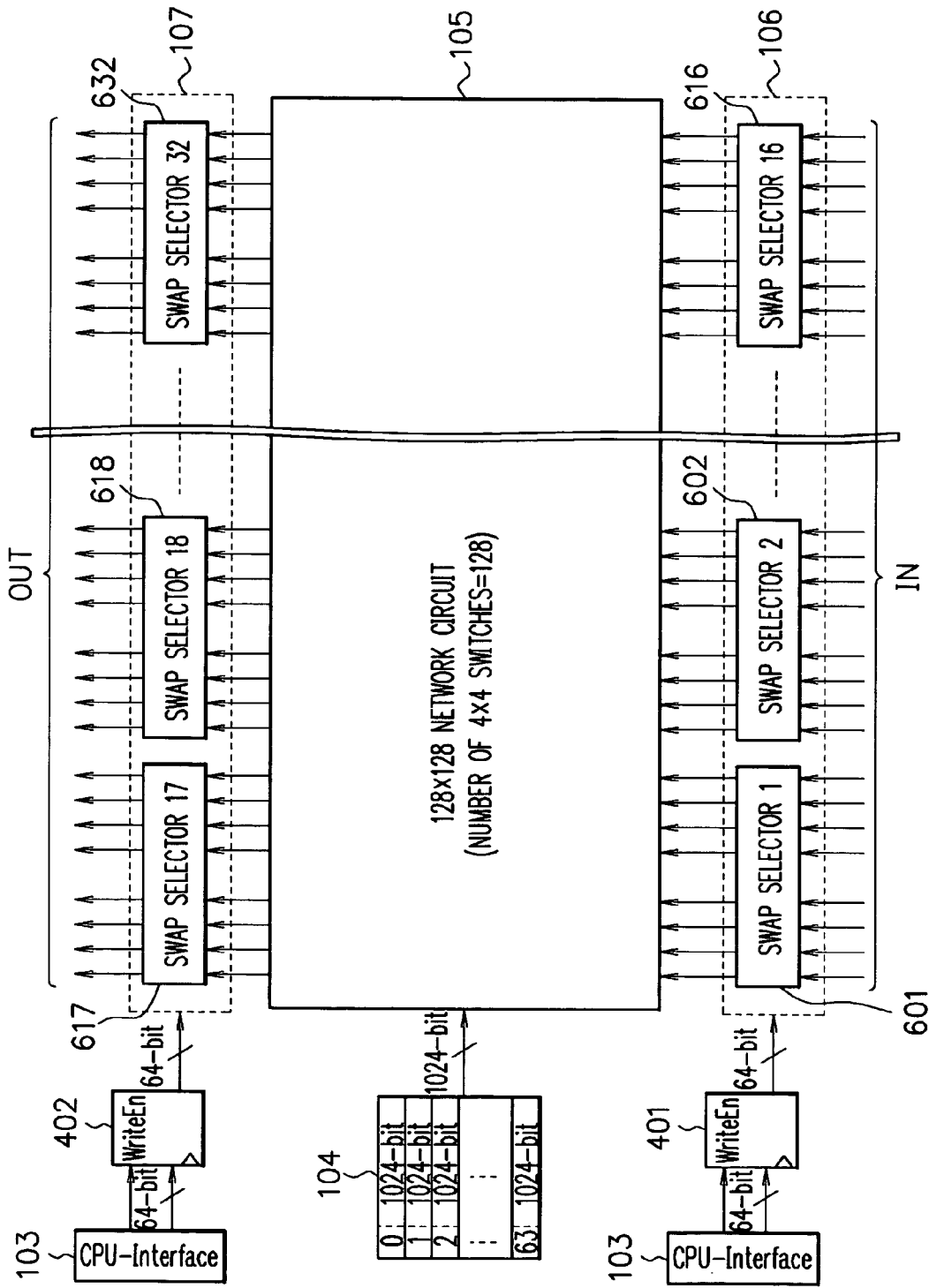
FIG. 6 shows a diagram illustrating a more concrete configuration example of the reconfigurable circuit shown in FIG. 4.

FIG. 6 shows a diagram illustrating a more concrete configuration example of the reconfigurable circuit shown in FIG. 4. In FIG. 6, a register 402 is added to the configuration shown in FIG. 4. The selector 106 includes sixteen (16) swap selectors 601-616. The selector 107 includes sixteen (16) swap selectors 617-632.

The configuration RAM 104 stores network control signal information for 64 planes: the configuration 0 to the configuration 63. The network control signal information has 1,024 bits per plane. According to the configuration address being input from the CPU 101, the configuration RAM 104 outputs the 1,024-bit network control signal information to the network circuit 105. The network circuit 105 includes 128 input terminals, 128 output terminals and 128 switches. As shown in FIG. 3, each the above switch includes four input terminals and four output terminals, and controls the connections between the four input terminals and the four output terminals according to an 8-bit control signal. The 128 switches are controlled by receiving a control signal input having 128× 8=1,024 bits from the configuration RAM 104.

The register 401 is a flip-flop, which is connected to the CPU 101 via the CPU bus 102 and the CPU interface 103, and stores 64-bit selector control signal information. The CPU 101 can write the 64-bit selector control signal information into the register 401. According to the 64-bit selector control signal information stored in the register 401, the selector 106 can exchange the connections between the output terminals of the arithmetic units 111-11$n$ and the input terminals of the network circuit 105.

The register 402 is a flip-flop, which is connected to the CPU 101 via the CPU bus 102 and the CPU interface 103, and stores 64-bit selector control signal information. The CPU 101 can write the 64-bit selector control signal information into the register 402. According to the 64-bit selector control signal information stored in the register 402, the selector 107 can exchange the connections between the input terminals of the arithmetic units 111-11$n$ and the output terminals of the network circuit 105.

FIG. 7 shows a diagram illustrating a configuration example of the swap selector 601. The swap selector 601 includes eight (8) input terminals in0-in7, and eight (8) output terminals out0-out7. The input terminals in0-in7 are connected to the output terminals of the arithmetic units 111-11$n$. The output terminals out0-out7 are connected to the input terminals of the network circuit 105. According to a 4-bit selector control signal, the swap selector 601 exchanges the connections between the eight input terminals in0-in7 and the eight output terminals out0-out7.

When a first bit of the selector control signal is in a first state (for example, '0'), the input terminal in0 is connected to the output terminal out0, and the input terminal in4 is connected to the output terminal out4. On the other hand, when the first bit of the selector control signal is in a second state (for example, '1'), the input terminal in0 is connected to the output terminal out4, and the input terminal in4 is connected to the output terminal out0.

When a second bit of the selector control signal is in a first state (for example, '0'), the input terminal in1 is connected to the output terminal out1, and the input terminal in5 is connected to the output terminal out5. On the other hand, when the second bit of the selector control signal is in a second state (for example, '1'), the input terminal in1 is connected to the output terminal out5, and the input terminal in5 is connected to the output terminal out1.

When a third bit of the selector control signal is in a first state (for example, '0'), the input terminal in2 is connected to the output terminal out2, and the input terminal in6 is connected to the output terminal out6. On the other hand, when the second bit of the selector control signal is in a second state (for example, '1'), the input terminal in2 is connected to the output terminal out6, and the input terminal in6 is connected to the output terminal out2.

When a fourth bit of the selector control signal is in a first state (for example, '0'), the input terminal in3 is connected to the output terminal out3, and the input terminal in7 is connected to the output terminal out7. On the other hand, when the second bit of the selector control signal is in a second state (for example, '1'), the input terminal in3 is connected to the output terminal out7, and the input terminal in7 is connected to the output terminal out3.

As described above, when the selector control signal is in the first state, the swap selector 601 performs straight connections without exchanging the connections between the input terminals in0-in7 and the output terminals out0-out7, while when the selector control signal is in the second state, the swap selector 601 performs cross connections by exchanging the connections between the input terminals in0-in7 and the output terminals out0-out7.

Other swap selectors 602-632 have the same configuration as the swap selector 601. The selector 106 includes sixteen (16) swap selectors 601-616. Each swap selector 601-616 is controlled based on a 4-bit selector control signal. Accordingly, sixteen (16) swap selectors 601-616 in the selector 106 are controlled by inputting from the register 401 a selector control signal having 16×4=64 bits. Similarly, sixteen (16) swap selectors 617-632 in the selector 107 are controlled by inputting from the register 402 a selector control signal having 16×4=64 bits.

Each of the swap selectors 601-632 includes eight (8) input terminals in0-in7 and eight (8) output terminals out0-out7. Accordingly, the selector 106 having 16 swap selectors 601-616 includes 16×8=128 input terminals IN and 128 output terminals. Similarly, the selector 107 having 16 swap selectors 617-632 includes 16×8=128 input terminals and 128 output terminals OUT.

The network control signal information which the configuration RAM 104 outputs to the network circuit 105 has 1,024 bits. In case that the configuration RAM 104 stores the network control signal information for 64 planes, a capacity of the order of 64 kbits is required. In contrast, in order to control the selectors 106, 107, the register 401 includes 64 flip-flops and also the register 402 includes 64 flip-flops. Further, two CPU interfaces 103 are required for the registers 401, 402. Even in case of adding the selectors 106, 107, the circuit scale can be restrained, as compared to the network circuit 105 and the configuration RAM 104.

According to the present embodiment, in order to avoid data conflict in the network circuit 105, the selectors 106, 107 are added to modify the connections between the network circuit 105 and the arithmetic units 111-11n even after the completion of the hardware. More specifically, as shown in FIG. 6, the selector 106 is provided between the output terminals of the arithmetic units 111-11n and the input terminals of the network circuit 105, and also the selector 107 is provided between the input terminals of the arithmetic units 111-11n and the output terminals of the network circuit 105.

The selector control signals for the selectors 106, 107 are input from the registers 401, 402, instead of being input from the configuration RAM 104. The CPU 101 writes the selector control signal information to the registers 401, 402, via the CPU interfaces 103. The reason for not using the configuration RAM 104 is that, in addition to the aim at reducing the circuit scale, the connection settings of the arithmetic units 111-11n and the network circuit 105 are assumed to be performed only at the time of initiation setting of the reconfigurable circuit, as shown in FIG. 5. Because the configuration RAM 104 is used when the settings are desired to switch during operation, a capacity of (the number of bits to be set)×(the number of planes of switchover) is required. Therefore, by limiting the portion to be switched over during the operation, and by setting the other portions at the time of initiation by writing from the CPU 101, it becomes possible to improve the degree of freedom in the network connection with a reduced circuit scale.

Because the connections between the network module 801 and the arithmetic units are fixed by hardware in the reconfigurable circuit shown in FIG. 11, there may be cases that the intended network connections cannot be attained at the time of connecting between the output terminals and the input terminals of the arithmetic units, due to network routing limitation. To solve the above problem, according to the present embodiment, it is possible to set into the registers 401, 402 the selector control signal information for exchanging the connections between the network circuit 105 and the arithmetic units 111-11n. By exchanging the connections based on the above selector control signal information, the selectors 106, 107 can improve the degree of freedom in the network connection. Further, because the connection exchanging function of the selectors 106, 107 can be set by the registers 401, 402, it is possible to reduce the circuit scale as compared to the case of using the configuration RAM 104. Thus, with the provision of the selectors 106, 107, it becomes possible to reduce the circuit scale, and also increase the number of connectable combinations between the output terminals and the input terminals of the arithmetic unit group.

The present embodiment is not limited to the case of providing both the selectors 106 and 107. It may be possible to provide the selector 106 only, with the deletion of the selector 107. Or, it may be possible to provide the selector 107 only, with the deletion of the selector 106.

The foregoing embodiment merely shows an example of concretion when incorporating the present invention, and therefore, it is to be understood that the technical scope of the present invention is not restricted thereto. Accordingly, the present invention can be realized in a variety of forms without deviating from the technical ideas or the major features thereof.

With the provision of a first selector, it becomes possible to reduce the circuit scale, and also increase the number of connectable combinations between output terminals and input terminals of an arithmetic unit group.

What is claimed is:

1. A reconfigurable circuit comprising:
    an arithmetic unit group including a first output terminal and a second output terminal, and performing arithmetic operations;
    a network circuit including a first input terminal, a second input terminal and a switch, and switching connections between output terminals and input terminals of said arithmetic unit group by the switch; and
    a first selector connected between said arithmetic unit group and the network circuit,
    wherein the output terminals of said arithmetic unit group are connected to input terminals of said first selector,
    output terminals of said first selector are connected to input terminals of said network circuit, and
    output terminals of said net work circuit are connected to the input terminals of said arithmetic unit group, and
    wherein when a first control signal is in a first state, said first selector connects said first output terminal of the arithmetic unit group to said first input terminal of the network circuit, and also connects said second output terminal of the arithmetic unit group to said second input terminal of the network circuit, while when the first control signal is in a second state, said first selector connects said first output terminal of the arithmetic unit group to said second input terminal of the network circuit, and also connects said second output terminal of the arithmetic unit group to said first input terminal of the network circuit.

2. The reconfigurable circuit according to claim 1,
    wherein said arithmetic unit group further comprises a third output terminal and a fourth output terminal, and
    said network circuit further comprises a third input terminal and a fourth input terminal, and
    when a second control signal is in a first state, said first selector connects said third output terminal of the arithmetic unit group to said third input terminal of the network circuit, and also connects said fourth output terminal of the arithmetic unit group to said fourth input terminal of the network circuit, while when the second control signal is in a second state, said first selector connects said third output terminal of the arithmetic unit group to said fourth input terminal of the network circuit, and also connects said fourth output terminal of the arithmetic unit group to said third input terminal of the network circuit.

3. The reconfigurable circuit according to claim 1, further comprising:
a network memory storing network control signal information; and
a register storing first control signal information,
wherein said network circuit controls said connection according to the network control signal information stored in said network memory, and
said first selector performs said connection according to the first control signal information stored in said register.

4. A reconfigurable circuit comprising:
an arithmetic unit group including a first input terminal and a second input terminal, and performing arithmetic operations;
a network circuit including a first output terminal, a second output terminal and a switch, and switching connections between output terminals and input terminals of said arithmetic unit group by the switch; and
a first selector connected between said arithmetic unit group and the network circuit,
wherein the output terminals of said arithmetic unit group are connected to an input terminals of said network circuit,
output terminals of said network circuit are connected to input terminals of said first selector, and
output terminals of said first selector are connected to the input terminals of said arithmetic unit group, and
wherein when the first control signal is in the first state, said first selector connects said first input terminal of the arithmetic unit group to said first output terminal of the network circuit, and also connects said second input terminal of the arithmetic unit group to said second output terminal of the network circuit, while when the first control signal is in the second state, said first selector connects said first input terminal of the arithmetic unit group to said second output terminal of the network circuit, and also connects said second input terminal of the arithmetic unit group to said first output terminal of the network circuit.

5. The reconfigurable circuit according to claim 4,
wherein said arithmetic unit group further comprises a third input terminal and a fourth input terminal, and
said network circuit further comprises a third output terminal and a fourth output terminal, and
when a second control signal is in a first state, said first selector connects said third input terminal of the arithmetic unit group to said third output terminal of the network circuit, and also connects said fourth input terminal of the arithmetic unit group to said fourth output terminal of the network circuit, while when a second control signal is in a second state, said first selector connects said third input terminal of the arithmetic unit group to said fourth output terminal of the network circuit, and also connects said fourth input terminal of the arithmetic unit group to said third output terminal of the network circuit.

6. The reconfigurable circuit according to claim 4, further comprising:
a network memory storing network control signal information; and
a register storing first control signal information,
wherein said network circuit controls said connection according to the network control signal information stored in said network memory, and
said first selector performs said connection according to the first control signal information stored in said register.

7. A reconfigurable circuit comprising:
an arithmetic unit group including a first input terminal, a second input terminal, a first output terminal and a second output terminal, and performing arithmetic operations;
a network circuit including a first input terminal, a second input terminal, a first output terminal, a second output terminal and a switch, and switching connections between output terminals and input terminals of said arithmetic unit group by the switch;
a first selector connected between said arithmetic unit group and the network circuit; and
a second selector connected between said arithmetic unit group and the network circuit,
wherein the output terminals of said arithmetic unit group are connected to input terminals of said first selector,
output terminals of said first selector are connected to input terminals of said network circuit,
output terminals of said network circuit are connected to input terminals of said second selector, and
output terminals of said second selector are connected to the input terminals of said arithmetic unit group, and
wherein when the first control signal is in the first state, said first selector connects said first output terminal of the arithmetic unit group to said first input terminal of the network circuit, and also connects said second output terminal of the arithmetic unit group to said second input terminal of the network circuit, while when the first control signal is in the second state, said first selector connects said first output terminal of the arithmetic unit group to said second input terminal of the network circuit, and also connects said second output terminal of the arithmetic unit group to said first input terminal of the network circuit, and
wherein when a second control signal is in a first state, said second selector connects said first input terminal of the arithmetic unit group to said first output terminal of the network circuit, and also connects said second input terminal of the arithmetic unit group to said second output terminal of the network circuit, while when the second control signal is in a second state, said second selector connects said first input terminal of the arithmetic unit group to said second output terminal of the network circuit, and also connects said second input terminal of the arithmetic unit group to said first output terminal of the network circuit.

8. The reconfigurable circuit according to claim 7,
wherein said arithmetic unit group further comprises a third input terminal, a fourth input terminal, a third output terminal and a fourth output terminal, and
said network circuit further comprises a third input terminal, a fourth input terminal, a third output terminal and a fourth output terminal, and
when a third control signal is in a first state, said first selector connects said third output terminal of the arithmetic unit group to said third input terminal of the network circuit, and also connects said fourth output terminal of the arithmetic unit group to said fourth input terminal of the network circuit, while when the third control signal is in a second state, said first selector connects said third output terminal of the arithmetic unit group to said fourth input terminal of the network circuit, and also connects said fourth output terminal of the arithmetic unit group to said third input terminal of the network circuit, and wherein when a fourth control signal is in a first state, said second selector connects said third input terminal of the arithmetic unit group to said third output terminal of the network circuit, and also connects said fourth input terminal of the arithmetic unit group to said fourth output terminal of the network circuit, while when the fourth control signal is in a second state, said second selector connects said third input terminal of the arithmetic unit group to said fourth output terminal of the network circuit, and also connects said fourth input terminal of the arithmetic unit group to said third output terminal of the network circuit.

9. The reconfigurable circuit according to claim 7, further comprising:

a network memory storing network control signal information;

a first register storing first control signal information; and a second register storing second control signal information, wherein said network circuit controls said connection according to said network control signal information stored in said network memory, and said first selector performs said connection according to said first control signal information stored in said first register, and said second selector performs said connection according to said second control signal information stored in said second register.

* * * * *